United States Patent Office 2,921,083
Patented Jan. 12, 1960

---

2,921,083

ORGANIC THIOSULFATES

Van R. Gaertner, Dayton, Ohio, assignor to Monsanto Chemical Company, St. Louis, Mo., a corporation of Delaware No Drawing. Application March 5, 1957
Serial No. 643,936

26 Claims. (Cl. 260—400)

---

The present invention is directed to long-chain vic-hydroxy aliphatic thiosulfates, to methods of preparing such compounds, and to cleaning compositions containing the same. The invention is further directed to a general method of solubilizing hydrophobic materials.

The long-chain vic-hydroxy aliphatic thiosulfates are new compounds which have valuable utility as surface active agents.

An object of the present invention is to provide useful and efficient detergents and surfactants. With this in view, it has been discovered that the vic-hydroxy aliphatic thiosulfates of the present invention have remarkably good detergent properties, and unusual foam forming and foam stabilizing properties.

A further object of the invention is to provide synthetic detergents which are suitable for use as "bar soap" stock, i.e., suitable for the production of bars to be used in the washing of hands and for personal cleanliness. In the past, efforts have been made to formulate synthetic detergent "bar soaps." However, most synthetic detergents are too water soluble, too oily or waxy to hold a bar shape, or are lacking in "soapy feel," and are therefore unsatisfactory for this special application. In most, if not all, commercial synthetic detergent "bar soaps" it has been necessary to incorporate a hardening agent of some kind in order to overcome the natural oily or waxy character of the detergent. It has now been discovered that some of the β-hydroxy aliphatic thiosulfates have the low water solubility, crystalline type structure, and a "soapy feel" which are required for "bar soaps" and these compounds will therefore make it more feasible to utilize the cleaning efficiency of synthetic detergents in "bar soap" form.

A further object of the present invention is to provide efficient methods of making long-chain β-hydroxy aliphatic thiosulfate surfactants.

It is a further object of the invention to provide general methods of water-solubilizing hydrophobic organic materials. In many applications it is desirable to have a method for increasing the water solubility or water emulsifiability of such materials. For example, in toxicological and pharmaceutical applications it is often desirable for materials to have a degree of water solubility, in order to have a given effect, or in order that they may be applied in solution or emulsion form. By the method of the present invention it is possible to convert hydrophobic materials, particularly long-chain predominantly hydrocarbon materials, into more water soluble forms. It is only necessary that a suitable functional group be present, or be introduced to be present, in the hydrophobic material, and the hydrophobic material can then be reacted with haloalkylene oxides, e.g., epichlorohydrin, to produce glycidyl derivatives which can, in turn, be reacted with thiosulfates to produce vic-hydroxy thiosulfate derivatives. The vic-hydroxy thiosulfate derivatives are generally considerably more water soluble than the original hydrophobic materials. As active hydrogen containing functional groups which are suitable for the reaction with haloalkylene oxides, there are, for example, hydroxyl, phenolic hydroxyl, carboxyl, amino, imino, sulfhydryl, etc. groups.

The new compounds of the present invention can be represented by the formula:

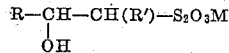

in which R is an aliphatic radial of 6 to 18 or more carbon atoms, R' is hydrogen or an aliphatic radical of no more than 18 carbon atoms, and M is hydrogen or a salt-forming cation. R and R' taken together ordinarily have no more than 18 carbon atoms, and M is preferably the ammonium ion, an organic ammonium ion, or an alkali metal ion.

Ordinarily the preferred vic-hydroxy aliphatic thiosulfate surfactants correspond to the formula:

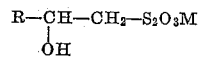

in which R and M can have the meanings set forth above. These compounds containing no substitution on the α-carbon atom are not only better surfactants, but also they are generally easier of preparation than α-substituted compounds, because the required epoxides generally react more readily.

In the above formulae, R can be a branched or straight chain aliphatic radical having the stated number of carbon atoms. The term aliphatic is intended to include radicals containing carbonyl, ester, ether, thioether, disulfide, polysulfide, hydroxyl and such other groups as will not deleteriously effect the surface active properties of the compound.

One group of valuable detergents are the vic-hydroxy aliphatic hydrocarbon thiosulfates, particularly the 2-hydroxyalkyl thiosulfates. The aliphatic groups in such agents can have either branched or straight chains, and can be saturated or can contain unsaturated bonds, particularly non-conjugated olefinic bonds. Examples of such compounds are: sodium 2-hydroxy-1-dodecyl thiosulfate, sodium 2-hydroxy-1-hexadecyl- and -octadecyl-thiosulfates, sodium 2,4-dimethyl-2-hydroxy-1-hexyl thiosulfate, sodium 2-hydroxy-1-nonadecyl thiosulfate, potassium 2-hydroxy-1-decyl thiosulfate, sodium 12-bromo-2-hydroxy-1-dodecyl thiosulfate, sodium 2-hydroxy-1-octyl thiosulfate, sodium 3-hydroxy-2-tridecyl thiosulfate, sodium 2-hydroxy-4-dodecen-1-yl thiosulfate, sodium 2-hydroxy-1-tetradecyl thiosulfate, sodium 2-hydroxy-1-eicosyl thiosulfate, ammonium 2-hydroxy-1-dodecyl thiosulfate, etc., and the branched chain aliphatic β-hydroxy thiosulates formed from alkali thiosulfates and the 1,2-epoxides of propylene trimers, tetramers, or higher polymers, or the 1,2-epoxides of isobutylene dimers, trimers, tetramers, etc., or the 1,2-epoxides of low molecular weight mixed polymerizates of such lower aliphatic olefins.

The above vic-hydroxy aliphatic hydrocarbon thiosulfates are formed by a reaction between the corresponding aliphatic epoxide, and an alkaline thiosulfate. The required epoxides are ordinarily obtained by epoxidation of olefins with an oxidizing agent, e.g., peracetic acid or by dehydrohalogenation of the corresponding chlorohydrins. In commercial practice, the olefins for preparing straight chain epoxides are generally obtained by dehydration of normal alcohols, while a good source for the branched chain olefins is found in the polyalkylenes formed by condensation of such olefins as propylene, isobutylene, etc. Such condensation, or polymerization, takes place in known manner with sulfuric acid or metal halide catalysts, or can be conducted by simultaneous dehydration and polymerization of tertiary butyl alcohol or isopropyl by concentrated sulfuric acid.

Another possible source of branched chain olefins is provided by dehydration of "Oxo" process alcohols, i.e., alcohols obtained by the high pressure reaction of polyalkylenes, e.g., propylene tetramer or isopropylene trimer with carbon monoxide and hydrogen; however, this is not a completely satisfactory source of such olefins, as some of the isomeric "Oxo" process alcohols are not readily subject to dehydration.

In the above polyalkylenes, the residual olefinic unsaturation will ordinarily be at the 1,2-position, and the epoxy compound produced therefrom will have a 1,2-epoxy group. However, the polyalkylenes are still suitable for producing the epoxides if the olefinic unsaturation is elsewhere in the molecule; if more than one olefin group is present in such an aliphatic hydrocarbon, either one or both of the olefinic groups can be epoxidized, and both the mono- and di-epoxy compounds are suitable for preparing thiosulfate surfactant compositions.

In the above definitions and elsewhere in the present specification, it will be realized that the term "aliphatic hydrocarbon" is used in the broad sense and does not exclude the presence of relatively inert substituents, e.g., halogens, which will have little effect upon the properties of the compounds concerned. Most of the good surfactants will have aliphatic groups in the range of 12 to 20 or more carbon atoms.

Other aliphatic groups than the above aliphatic hydrocarbons can be used in the vic-hydroxy aliphatic thiosulfate surfactants of the present invention. For example, the compound represented by the formula:

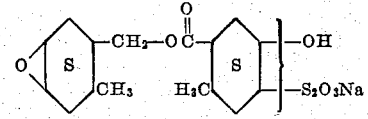

in which the thiosulfate group is attached to a secondary carbon atom, and in which the aliphatic group contains saturated aliphatic rings, an ester group, and an epoxy group, has useful surfactant properties; however, the compound will not have the excellent detersive properties of non-cyclic β-hydroxy aliphatic compounds of comparable molecular weight. Compounds such as sodium 3-nonylphenoxy-2-hydroxy-1-propyl thiosulfate and sodium 3-dodecylphenoxy-2-hydroxy-1-propyl thiosulfate have some useful detergent and other surfactant properties. Although non-cyclic aliphatic compounds are much preferred, it will be understood that in the present specification the term "aliphatic" is not intended to exclude all aromatic groups, so long as there are sufficient alkyl or other non-cyclic aliphatic carbon atoms present to make the compounds predominantly aliphatic in character and to give the desired surfactant properties. Eight or more non-cyclic aliphatic carbon atoms are occasionally sufficient, but twelve or more such carbon atoms are usually desirable.

In addition to the above compounds, the various alkyl ethers and thioethers of alkylene oxides will provide useful surfactants when converted to vic-hydroxy thiosulfates. For example, by reacting an "Oxo" alcohol with epichlorohydrin, a branched alkyl ether derivative of ethylene oxide is obtained, which can readily be converted to the corresponding β-hydroxy thiosulfate:

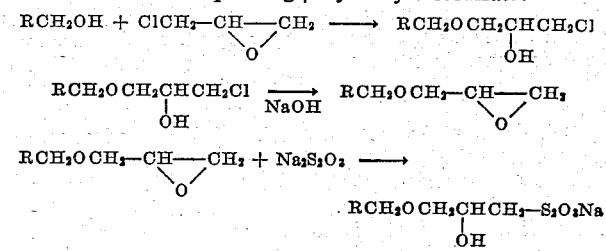

R designating the non-carbinol portion of an "Oxo" alcohol. Secondary and tertiary alcohols can in the same manner be converted to the corresponding β-hydroxy thiosulfate derivatives. In a similar manner, the various branched and straight chain mercaptans are converted to the corresponding thioether compounds. When an aliphatic acid is used in place of the alcohol, the corresponding esters are produced:

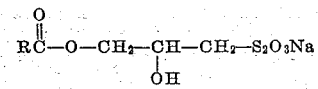

R designating the non-acyl portion of an aliphatic acid. It will be understood that in preparing the glycidyl esters, the acids will be used in the form of their salts.

It is also possible to prepare β-hydroxy thiosulfate derivatives of glycidyl polyethers by reacting such polyethers with alkaline thiosulfates. Glycidyl polyethers can be obtained by reacting various polyoxyalkylene compounds with halo alkylene oxides and then dehydrohalogenating. Various polyoxyalkylenes are applicable, for example, polyoxyethylene and polyoxypropylene ethers of various alcohols, such as straight or branched chain aliphatic alcohols of about 1 to 20 or 22 carbon atoms. These polyoxyalkylene ethers can, in turn, be formed by reacting alkylene oxides such as ethylene oxide or propylene oxide with an aliphatic alcohol according to known procedures. The polyoxyalkylene ethers can be represented by the formula:

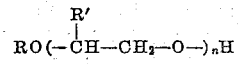

in which R is an alkyl radical of about 1 to 20 or 22 carbon atoms, $n$ is a number from 1 to about 25, and R' is hydrogen or a lower alkyl radical, e.g., methyl. If desired, aryloxy, alkaryloxy, acyloxy, or alkylthio groups can be used as end groups in place of the alkoxy group (RO), and the compounds will still be suitable for forming glycidyl ethers which are, in turn, suitable for preparing valuable vic-hydroxy thiosulfate surfactants according to the present invention. It is also contemplated to use "mixed" polyalkylene oxides, i.e., compounds formed by reactions of two or more alkylene oxides, e.g., ethylene oxide and propylene oxide; for example, the "Pluronics," e.g., the series of non-ionic surfactants formed with a polyoxypropylene having polyoxyethylene groups on both ends and with a molecular weight of 1800 to 8000, or such surfactants prepared by reacting lower alcohols with propylene oxide and then with ethylene oxide, are suitable for use in preparing glycidyl polyethers and vic-hydroxy thiosulfates according to my invention; however, it is generally more practical to use polyoxyalkylenes having a lower molecular weight than specified for the "Pluronics." It will be noted that the above polyalkylene ethers ordinarily contain free hydroxyl groups, and, as such, they represent a special case of the alcohols which are described hereinabove in regard to the production of alkoxy-vic-hydroxyalkyl thiosulfates.

For purposes of determining the proper aliphatic chain length for good surfactant properties, compounds containing one or so oxa, thia, and such atoms can usually be considered as equivalent in carbon atoms to compounds containing the same number of carbon atoms but lacking such other atoms.

The compounds of the present invention are ordinarily anionic surface active agents, i. e., the anionic portion of the compound, the

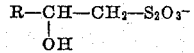

ion, is the active part. Therefore, the choice of the cationic portion of the compound, e.g., an alkali or alkaline earth metal, ammonium or amine ion, is generally of little significance. The compounds are conveniently used in the form of their alkali metal salts, particularly their sodium and potassium salts. However, in some cases the amine and ammonium salts will have advantages, particularly as emulsifiers. The corresponding thiosulfuric acids may occur as an intermediate in the preparation of the salts, and are readily prepared by acidification of the salts; however, the acids are a less desirable form for general use because of their lower stability, and also the fact that they tend to be more gummy (less crystalline) than the salts. The term "thiosulfate" as used herein is intended to include both the salt and the acid forms.

Ordinarily my novel compounds are used in the form of a salt such as can be formed with water-solubilizing salt-forming cations. In addition to alkali metal salts, e.g., lithium, potassium, and sodium salts, the ammonium and organic amine salts are useful, e.g., those obtained by neutralizing the thiosulfuric acid group with ammonia, ethanolamine, diethanolamine, triethanolamine, ethylamine, t-butylamine, t-octylamine, morpholine, etc.; in some special applications, the salts formed with cations of well-known cationic surfactants, e.g., quaternary ammonium ions, are of interest. In some cases, the compounds formed by neutralizing the thiosulfuric acid group with alkaline earth bases, e.g., lime, calcium carbonate, magnesium carbonate, etc., will be useful surfactants.

One of my novel methods of preparing long-chain vic-hydroxy aliphatic thiosulfates can be represented by the following equation:

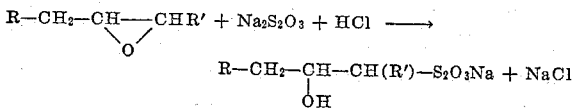

$$R-CH_2-CH-CH(R')-S_2O_3Na + NaCl$$
$$\quad\quad\quad\quad\quad\quad |$$
$$\quad\quad\quad\quad\quad\quad OH$$

in which R represents an aliphatic radical of at least 8 carbon atoms, and R' is hydrogen or an aliphatic radical. It will be noted that one molecule of hydrochloric acid is used in the reaction, thereby avoiding degradation of the product which would take place if the hydroxyl ion formed in the reaction were not neutralized. The use of various 1,2-epoxides permits the production of various $\beta$-hydroxy thiosulfates.

The method involves the addition, continuously or in small increments, of sufficient hydrochloric acid during the reaction to maintain the pH of the solution in the range of 6 to 8, and preferably in the range of 6 to 7, or just on the acid side as indicated by phenolphthalein indicator. The hydrochloric acid not only minimizes side reactions and degradation of the products thereby improving the yield and purity of the products, but hydrochloric acid is preferable to ordinary buffering agents because the resulting alkali chloride salts are readily separated from the reaction mixture thereby simplifying isolation procedures. It is preferred to conduct the reaction in an aqueous alcoholic solvent, e.g., ethyl-alcohol water, and to separate an aqueous salt-containing layer from the reaction mixture following the reaction, and then to utilize isopropyl alcohol in drying and isolating the product. In this method not only alkali, but any other reactants or contaminants which would react with or replace the thiosulfate or hydroxyl groups of the vic-hydroxy thiosulfates should be avoided. For example, alkaline mono-sulfides should be excluded from the reaction mixture.

Hydrochloric acid is especially suited for use in the thiosulfation reaction, its use being particularly advantageous for the reasons given hereinabove; however, it will be possible to use other acids, e.g., sulfuric acid, phosphoric acid, nitric acid, acetic acid, etc.

Although potassium and particularly sodium thiosulfates are the preferred alkaline thiosulfate reactants, other water-soluble alkali (including ammonium) and alkaline earth thiosulfates can be used.

To insure complete reaction of the aliphatic epoxides, it is ordinarily preferred to use a slight stoichiometric excess of alkali metal thiosulfate, although other amounts can be used, e.g., 0.5 to 2 moles of thiosulfate per mole of aliphatic 1,2-epoxide. The temperatures and reaction times can vary considerably, but temperatures, for example, of 50° C. to 100° C. for 1 to 30 hours will usually be suitable, and even room temperature (20° C.) is satisfactory in some cases. Temperatures of 70° to 80° C. are ordinarily preferred, although this depends to some extent on the reactants and choice of solvents.

Another aspect of the present invention involves the direct conversion of organic chlorohydrins to vic-hydroxy thiosulfates. A particular phase of this aspect concerns a method of converting alcohols to vic-hydroxy thiosulfates through reaction with a haloalkylene oxide, followed by treatment of the resulting chlorohydrin with an alkali metal thiosulfate under mildly alkaline conditions. While the direct conversion method is considered generally applicable to organic chlorohydrins having the structure

its greatest utility will probably lie in the preparation of the surfactant vic-hydroxy thiosulfates set forth in the present specification by general formula or otherwise, particularly those compounds having long hydrocarbon chains; the vic-chlorohydrins corresponding to the vic-epoxides which would be used in the hereinbefore described method of preparing such vic-hydroxy thiosulfates, can be used in the present direct method of preparing such vic-hydroxy thiosulfates; the vic-chlorohydrins corresponding to any of the vic-epoxides set forth herein by general formula or otherwise are applicable, so long as they contain no groups which are overly sensitive to alkali; as the thiosulfate group is sensitive to alkali but is not deleteriously affected by the mildly alkaline reaction conditions, it appears that the reaction conditions are not sufficiently alkaline to affect many groups ordinarily sensitive to alkali. As further describing vic-chlorohydrins which can be used in the direct conversion to the corresponding vic-hydroxy thiosulfates, the following formula is set forth:

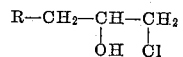

in which R can be such straight or branched-chain aliphatic, alicyclic or heterocyclic groups as alkyl, e.g., methyl, ethyl, propyl, isopropyl, butyl, isobutyl, t-butyl, pentyl, isopentyl, hexyl, heptyl, octyl, isooctyl, nonyl, decyl, undecyl, dodecyl, tridecyl, tetradecyl, pentadecyl, hexadecyl, octadecyl, eicosyl, etc.; aryl, e.g., phenyl, naphthyl, etc.; alkoxy, e.g., dodecoxy, tridecoxy, tetradecoxy, etc.; polyoxyalkylene ether; alkaryl; aralkyl; aryloxy; alkylthio, e.g., n-dodecylthio; arylthio; alkaryloxy; aralkoxy; alkyarylthio, e.g., dodecylphenylthio; aralkylthio and various heterocyclic radicals and heterocyclic substituted aliphatic radicals. Many useful compounds can be produced, for example, from chlorohydrins of the above formula when R is an aliphatic group of at least 6 carbon atoms.

A particularly valuable group of chlorohydrins for use in the direct conversion to vic-hydroxy thiosulfates are those oxypropylene chlorohydrins represented by the formula:

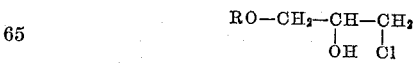

in which R can be any of the groups specified for R in the general chlorohydrin formula directly above (except those with oxy or thio endings, in which case it is necessary to omit the oxygen or sulfur atom, as —O—, rather than —O—O— or —O—S—, is the desired structure), or other straight or branched-chain aliphatic, alicyclic or heterocyclic structures.

The description of this method of reacting chlorohydrins as "direct" is not intended to describe the mechanism of the reaction or to imply that the chlorohydrin goes through no intermediate stages or compounds prior to the formation of the hydroxy thiosulfate; rather, the term is used with reference to the method of conducting the reaction in which the chlorohydrin and thiosulfate are directly mixed together or placed in the same reaction medium so that the vic-hydroxy thiosulfate will be produced under the described suitable conditions.

Mildly alkaline conditions are essential to the direct preparation of the hydroxy thiosulfates from the propylene chlorohydrins. The reaction apparently takes place in two stages in which the first stage uses alkali and the second stage generates alkali which is then again utilized in the first stage; at the end of the reaction approximately the starting amount of the alkali is present, and it can be neutralized by the addition of hydrochloric acid (or other acid) to avoid alkaline degradation of the thiosulfate group in the product compound. The amount of basic material to be used can vary to some extent, e.g., from about 5 to 40 or 50% of the stoichiometric amount (the chlorohydrin compound having a hydrogen equivalent of one); of course, the lower amounts such as 5 to 10% of stoichiometric will be used only when the chlorohydrin reacts readily; in most cases it will be desirable to add sufficient alkaline material to obtain fairly substantial reaction rates, although sufficient alkaline material to give high pH's, e.g., over 9 or 10, should not be used. It is generally desirable to have substantially all of the reaction take place below pH 9, perhaps largely in about the range of pH 8 to 9. The pH may actually be acidic at times during the procedure, but alkaline conditions are necessary initially for the reaction to go forward. Various alkaline materials can be used to obtain the mildly alkaline conditions for the reaction of thiosulfates with chlorohydrins. For example, the alkali metal hydroxides, such as sodium hydroxide, potassium hydroxide, etc. can be used; likewise, the alkaline earth metal hydroxides, e.g., calcium hydroxide, magnesium hydroxide, etc., can be used; similarly the alkali metal carbonates, bicarbonates, and salts of organic acids can be used. In some cases the poor solubility of a given base in the reaction medium, e.g., an aqueous or aqueous-alcoholic medium, will make the use of such base undesirable. While a solvent is ordinarily used to provide a reaction medium, its use is not indispensable. The feasibility of dispensing with the solvent depends to some extent upon the mutual intersolubilities of the thiosulfate, chlorohydrin, and base. Aqueous-alcoholic media are ordinarily preferred, e.g., solutions of water with methyl, ethyl, propyl, or isopropyl alcohol, or mixtures of the same; however, any solvents which are relatively inert under the reaction conditions, and in which the reactants and base have substantial solubility, can be used. Although potassium and particularly sodium thiosulfates are the preferred alkaline thiosulfate reactants, other water-soluble alkali and alkaline earth thiosulfates can be used. For the reaction, it is usually desirable to have approximately stoichiometric amounts of reactants, or a small excess of thiosulfate reactant, e.g., 1 to 1.5 moles of thiosulfate per mole of chlorohydrin compound, although other ratios, e.g., 0.5 to 2 moles of thiosulfate per mole of chlorohydrin, can be used.

The direct preparation of vic-hydroxy thiosulfates from chlorohydrins can be utilized in a procedure for water-solubilizing hydrophobic materials in a manner similar to the hereinbefore described method for water-solubilizing hydrophobic materials by converting them to glycidyl derivatives and thence to vic-hydroxy thiosulfates. Thus, a hydrophobic material with a suitable functional group can be converted to a chlorohydrin derivative through reaction with a chloroalkylene oxide, e.g., epichlorohydrin, and then reacted with a thiosulfate salt under mildly alkaline conditions to produce a vic-hydroxy thiosulfate. Active hydrogen containing functional groups in the hydrophobic material which are suitable for the above series of reactions are, for example, hydroxyl, phenolic hydroxyl, sulfhydryl, etc. groups. The conversion of the hydrophobic materials to chlorohydrins can be aided by the use of suitable alkaline or acidic materials as catalysts.

The following examples illustrate certain specific embodiments of the invention, but the invention is not limited thereto.

EXAMPLE 1

An amount of the 1,2-epoxides of a mixture of $C_{16}$ and $C_{18}$ olefins, 50.8 grams (0.2 mole), and 62 grams of sodium thiosulfate pentahydrate was added to 200 ml. of aqueous ethyl alcohol (1:1), and the mixture was heated with stirring. The sodium hydroxide produced in the reaction was neutralized by drop-wise addition of 1:1 concentrated hydrochloric acid:water in order to keep the pH in the range of 6–8 as determined by periodic testing with pHydrion 6.0–8.0 narrow range pH paper. During the procedure, the temperature was raised to about 80° C. and maintained there for approximately two hours. A lower aqueous layer containing some solid salts (probably sodium chloride and excess sodium thiosulfate) was drained from the reaction mixture, and the upper alcoholic layer was then dried by the addition and aspiration of isopropyl alcohol; some salts (NaCl) precipitated from the resulting dry isopropyl alcohol solution, and were filtered from the (hot) solution. Upon cooling the isopropyl alcohol solution, the 2-hydroxy-1-hexadecyl- and -octadecyl thiosulfate sodium salts crystallized and were filtered in nicely granular form. The granular product was washed with isopropyl alcohol and dried in a vacuum oven at less than 45° C. to give 55.7 grams of the white thiosulfate salt, for 71.3% of the theoretical yield (based on $C_{17}H_{34}O$ reactant, as average of $C_{16}$ and $C_{18}$ epoxides). The product was recrystallized from isopropyl alcohol to give the following analysis:

Calc'd. for $C_{17}H_{35}NaO_4S_2$: S, 16.4. Found: S, 16.21.

The sodium 2-hydroxy-1-hexadecyl- and -octadecyl thiosulfate salts had a soapy feel, and in "pellet" tests were shown to retain their shape well, and to be only slightly soluble in cold water, although fairly soluble in warm water. In addition, the salts were free of objectionable odor and practically tasteless, which properties not only make them more desirable for ordinary detergent uses, but also make possible applications in dentifrice formulations and the like.

EXAMPLE 2

In a procedure similar to that of Example 1, except for a different neutralization method, 50.8 grams of the oxide mixture (1,2-epoxyhexadecane and 1,2-epoxyoctadecane) and 25.2 grams of sodium bicarbonate were placed in 200 ml. of aqueous ethanol and heated at about 80° C. for slightly less than two hours. About 500 ml. of isopropyl alcohol was added, and 103 grams of aqueous-salt layer was separated from the mixture. The solution was aspirated to remove water, heated, and filtered while hot to remove salts. The filtrate was cooled and filtered, and the product was oven-dried at 50° C. to give 44.4 grams of white flakes. Upon concentrating the filtrates, and cooling, an additional 3.8 grams of white product was obtained, for a total of 48.2 grams for a 61.8% yield. A sample was recrystallized from isopropanolethanol and the resulting crystalline plates were dried at 56° C.

*Analysis.*—Calcd. for $C_{17}H_{35}NaO_4S_2$: S, 16.4. Found: S, 23.02.

Apparently these 2-hydroxy-1-hexadecyl- and -octadecyl thiosulfate salts still contain other salts. Because of the difficulty in purification when sodium bicarbonate or other buffering salts are used during the preparation of the vic-hydroxy aliphatic thiosulfates from epoxides, the hydrochloric acid neutralization procedure is much to be preferred. It will also be noted that the yield is higher when the acid neutralization procedure is used.

EXAMPLE 3

1,2-epoxydodecane, 55.3 grams (0.3 mole), and 124 grams (0.5 mole) sodium thiosulfate where heated and stirred in 200 ml. of ethanol-water (1:1) for about ¾ hour at 75 to 80° C. to obtain a clear, high foaming solution. Upon standing an hour the solution became turbid; the pH of the solution was over 12. Dilute hydrochloric acid was added to neutralize the liberated hydroxyl ions, and heating and stirring was continued with further additions of hydrochloric acid to keep the pH in the range of 7 to 8. After about an hour of heating with acid addition, the reaction mixture was permitted to cool. The lower aqueous layer was withdrawn, isopropyl alcohol was added, and additional aqueous layer was withdrawn, for a total of 188 grams of aqueous layer material, which was discarded. The alcohol layer was dried and filtered as in Example 1 to obtain 48.1 grams of sodium 2-hydroxy-1-dodecyl thiosulfate, for a 50% yield. A sample was recrystallized from isopropanol and dried at 56° overnight.

*Analysis.*—Calc'd. for

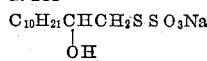

S, 20.0. Found: S, 18.41.

EXAMPLE 4

The procedure of Example 3 was essentially repeated, except for a difference in the neutralization procedure. A dash of phenolphthalein indicator solution (turning point corresponding to pHydrion reading of 6.4) was added to the reaction mixture and a 1:1 solution of concentrated (35%) hydrochloric acid in water was added dropwise so as to maintain the solution slightly on the acid (colorless) side as indicated by the phenolphthalein. The product was worked up and crystallized from isopropanol as in Example 3 and dried at less than 40° C., 78.5 grams of sodium 2-hydroxy-1-dodecyl thiosulfate being obtained in the form of crystalline plates, for a yield of 81.7%. A sample was recrystallized from isopropanol and dried.

*Analysis.*—Calc'd.: S, 20.0. Found: S, 19.98.

It is apparent that the continuous neutralization with hydrochloric acid gives much better results.

EXAMPLE 5

In 200 ml. of 50% aqueous ethanol, 54.1 grams (0.2 mole) of 3,4-epoxy-6-methylcyclohexylmethyl 3,4-epoxy-6-methylcyclohexanecarboxylate (EP 201, Union Carbide and Carbon Corporation) and 62 grams (0.25 mole) of sodium thiosulfate were heated and stirred for about an hour at 70 to 80° C. During the reaction 47 ml. of 5.85 N hydrochloric acid was added dropwise as necessary to maintain an acid pH as indicated by phenolphthalein. The final clear solution was brownish amber, but slowly developed a reddish cast due to developing alkalinity (in the presence of phenolphthalein). The aqueous layer was separated, isopropyl alcohol was added, and the drying procedure was conducted as in previous examples, but acid was added during the drying to counteract alkalinity. In addition, before the drying procedure, the alcohol solution was extracted with n-hexane to remove oils. Methyl alcohol was added to the dried material and insolubles were filtered from the hot solution. From the alcoholic solution, the product was obtained as a heavy gum which showed some tendency to crystallize and melted upon heating. The 82 grams of tan gum was oven-dried to a brittle solid which was soluble in methanol but not in isopropanol. A sample was dried at 56° C. in a drying pistol. The product,

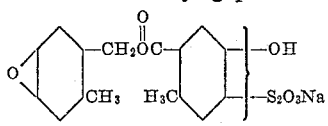

gave the following analysis:

Calc'd. for $C_{16}H_{25}O_7S_2Na$: S, 15.4. Found: S, 19.21.

EXAMPLE 6

1,2-epoxydiisobutylene, 32 grams, and 74.4 grams of sodium thiosulfate in 50 ml. of 1:1 ethanol-$H_2O$ was heated at around 80° C. with stirring, while 5.8 N hydrochloric acid was added to neutralize liberated hydroxyl ions as indicated by phenolphthalein indicator. Only a few drops of acid per hour were required. The reaction required several days (8 hours per day) before the rate became negligible. Upon working up the product in isopropanol as in Example 1, 34.8 grams of white solids was obtained, a yield of 52.6%. A sample of the sodium 2-hydroxy-2,4,4-trimethyl-1-pentyl thiosulfate was recrystallized two times from isopropanol, and dried for a day at 56° under vacuum.

*Analysis.*—Calc'd.: S, 24.3. Found: S, 25.62.

EXAMPLE 7

Nonylphenyl glycidyl ether was prepared by reacting nonylphenol with epichlorohydrin. The epichlorohydrin, 0.6 mole, was added to the phenol, 0.5 mole, in 500 ml. of water containing 0.1 mole of KOH. The mixture was heated to 90°–100° C. for about an hour, and additional KOH (more than 0.5 mole) was added to maintain alkalinity during an additional heating period of for about one hour. The reaction mixture was cooled and the organic layer was separated from the aqueous layer and washed with water. The organic layer was then dried and distilled at 155–174° C. at 0.2 mm. Hg, as a viscous, water-white material.

*Analysis.*—Calc'd. for $C_{18}H_{26}O_2$: C, 78.2; H, 10.2. Found: C, 76.16; H, 10.36.

A portion of the nonylphenyl glycidyl ether, 38.7 grams, was then reacted with sodium thiosulfate in aqueous ethanol solution. The reaction was conducted at 70 to 80° C. with hydrochloric acid addition to maintain acidity as indicated by phenolphthalein. The resulting alcohol layer was separated from the aqueous layer, extracted with hexane, and dried in isopropanol as in the previous examples, giving 43.5 grams of sodium 2-hydroxy-3-nonylphenoxy-1-propyl thiosulfate as a waxy solid. The yield was 75.2% of theory, based on the nonylphenyl glycidyl ether. The compound gave a clear, high foaming solution in water.

EXAMPLE 8

In a procedure similar to that of Example 7, dodecylphenyl glycidyl ether was prepared by reacting dodecylphenol with epichlorohydrin in the presence of sodium hydroxide and dioxane. The product was worked up by extracting with ether, washing the extract with water saturated with salt, drying over sodium sulfate, and removing the ether by heating under vacuum. The crude dodecylphenyl glycidyl ether, 118.3 grams, was obtained as a slightly yellow liquid. A 95.6 gram (0.30 mole) portion of this material was reacted with 74.4 grams (0.3 mole) of sodium thiosulfate in aqueous ethyl alcohol. The reaction required about 1 hour at 70 to 80° C., with dropwise addition of hydrochloric acid to maintain acidity (phenolphthalein indicator). The warm reaction mixture separated into 3 layers. The lower aqueous salt layer was separated, and 100 ml. hexane was added to the remaining layers to facilitate separation of the upper oil layer (containing unreacted dodecylphenol), which was then back extracted with 50% aqueous ethanol. The product (middle) layer was separated, dried, and salts were filtered therefrom as in Example 1, to obtain the sodium 2-hydroxy-3-dodecylphenoxy-1-propyl thiosulfate, 56.4 grams. The product compound was a nearly colorless gum which was soluble in water and isopropyl alcohol.

EXAMPLE 9 n-Dodecyl glycidyl sulfide was prepared by reacting epichlorohydrin with n-dodecyl mercaptan. The reaction was started with 100% excess epichlorohydrin, but with only a small fraction of the required alkali; after the initial reaction, the excess epichlorohydrin was removed by heating under vacuum, then additional sodium hydroxide (making 10% excess in all) was added, and the mixture was heated at 95–100° C. for 18 hours. Upon working up the product, a solid was obtained from methanol-ether as nearly white plates, M.P. 47–49° (turbid), in an amount of 70.0 grams. This solid gave very little reaction with sodium thiosulfate indicating that it contained very few epoxy groups. Upon evaporation of the methanol-ether mother liquors, 44 grams of crude n-dodecyl glycidyl sulfide was obtained as an oil. The 44 grams of oil was added to aqueous ethanolic sodium thiosulfate and permitted to react. The amount of hydrochloric acid required to maintain acidity was equivalent to 21.2 grams n-dodecyl glycidyl sulfide. About 21 grams of unreacted oil was recovered by hexane extraction. The ethanol-water layer was worked up as usual to give 30.6 grams of white plates from ethanol, a 15.5% yield of sodium 4-thia-2-hydroxy-1-hexadecyl thiosulfate,

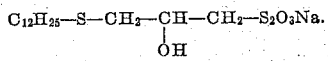

In a procedure similar to the above procedure, t-dodecyl mercaptan was reacted to prepare sodium 3-t-dodecylthio-2-hydroxy-1-propyl thiosulfate.

EXAMPLE 10

Vinyl cyclohexene dioxide, 28.4 grams,

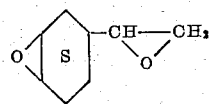

was reacted with sodium thiosulfate, 52.2 grams, in aqueous ethanol (200 ml.) with addition of hydrochloric acid. At room temperature the reaction was spontaneous, causing the pot temperature to rise to 35 to 45° C. A clear and pH stable solution, 293 ml., was obtained. Part of the solution, 106 ml., was added dropwise to 200 ml. of ethanol containing 0.56 gram potassium hydroxide and 20 grams of n-dodecanethiol. The mixture was then heated and stirred at 65 to 70° for about 2 hours, at which time the pH was 4; potassium hydroxide was added to bring the pH to 8, and the mixture was heated one hour with no change in pH. Another 10 ml. of the aliphatic thiosulfate solution was added, and heating was continued. After a total time of five hours, another 30 ml. of the aliphatic thiosulfate solution was added, and heating was continued for thirty minutes. The mixture was cooled and dried as usual, and much isopropyl alcohol-insoluble gum was removed. From the isopropyl alcohol solution, 16.9 grams of hard, glassy product was isolated, sodium 2-(dodecylthiohydroxycyclohexyl)-2-hydroxyethyl thiosulfate.

EXAMPLE 11

Epichlorohydrin, 0.5 mole, was added dropwise to 1 mole of branched chain tridecanol ("Oxo" tridecyl alcohol, Enjay) containing 1 ml. BF₃-etherate as catalyst. During the half-hour addition, the temperature rose to 70 to 80° C. The reaction mixture was then heated to about 100° C. for approximately an hour. The reaction mixture was then cooled and 55 grams 40% sodium hydroxide solution was added. The mixture was then heated, the temperature being raised to 90° in a little more than an hour, and maintained at 95 to 100° C. for another hour.

The reaction mixture was cooled and drowned with hexane, and the organic layer was separated, washed and dried over sodium sulfate; the hexane was removed by distillation to leave 222.5 gram of a water-white material.

Distillation of a portion of this crude product indicated that it contained 91.9 grams of tridecyl glycidyl ether, a yield of 71.6%. The tridecyl glycidyl ether boiled at 110–118°/4 mm., and was of refractive index $n_D^{25}$ 1.4455.

In place of the BF₃-etherate catalyst used above, other acid acting fluorine compounds such as those disclosed in U.S. Patent No. 2,260,753 can be used; or other acids or acidic compounds, e.g., $H_2SO_4$ and $FeCl_3$, or any of the catalysts disclosed in U.S. Patent No. 2,010,726.

A 111.3 gram amount of the crude product was heated with 62 grams (0.25 mole) of sodium thiosulfate in about 200 ml. of aqueous ethanol with the addition of hydrochloric acid to maintain slight acidity to phenolphthalein. The reaction temperature was maintained at about 80° C. for about 1½ hours. A total of about 0.17 mole of acid was used, indicating that about 0.17 mole of epoxide had reacted (this indicates that yield in the preparation of the tridecyl glycidyl ether was about 68%). The cooled reaction mixture was homogeneous, even after diluting with 250 ml. water. To the diluted mixture, about 200 ml. hexane, and 100 ml. saturated aqueous sodium chloride was added. The resulting emulsion was stable at room temperature, but upon being heated to 60° C. it began to separate slowly. The lower layer which contained little or no product was discarded. The upper layer was extracted three times with 250 ml. water, once in the warm and twice in the cold. The water was removed by distillation with isopropanol, a little extra water being added to steam distill some unextracted tridecanol; the distillation was continued until a clear aqueous solution was obtained upon diluting a sample of the pot residue. The sodium 2-hydroxy-3-tridecoxy-1-propyl thiosulfate product, 105 grams in amount, was a thick creamy gum. The tridecoxy compound had the soapy feel, good lathering characteristics and water-solubility required for bar stock, and also had good detersive properties.

When the above procedure was varied by distilling the tridecyl glycidyl ether and using this distilled material (substantially free from tridecanol) in the preparation of the thiosulfate, the product was obtained in crystalline form by crystallization from isopropanol, yield 68.3%. This "purified" sodium 2-hydroxy-3-tridecoxy-1-propyl thiosulfate was still better in surfactant properties, especially in those properties required for bar stock; the hand-lathering characteristics of the compound were superior to those of any other compounds tested.

Analysis.—Calc'd. for $C_{16}H_{33}O_5S_2Na$: S, 16.3. Found: S, 16.49, 16.55.

EXAMPLE 12

Epichlorohydrin, 95 grams, was added to isodecanol, 316.6 grams, containing a small amount of BF₃-etherate catalyst. The mixture was stirred without heating for one hour, and was then allowed to stand for several hours. To the mixture 110 ml. of 40% aqueous sodium hydroxide was added dropwise. The reaction mixture was then heated for about 6 hours at about 90° C. After the usual filtering and drying steps, the product was distilled, the isodecyl glycidyl ether being taken off at 83–94° C./0.2–0.4 mm., $n_D^{22°}$ 1.4405. The 136.5 grams of the glycidyl ether represented a 63.7% yield based on epichlorohydrin.

The isodecyl glycidyl ether, 53.5 gram (0.25 mole) was treated with 74.3 grams sodium thiosulfate in aqueous ethanol (100 ml. ethyl alcohol:100 ml. water). Alkalinity was prevented by adding hydrochloric acid in the usual manner, a total of 0.251 mole being added. Isopropanol was added and the mixture was dried in the usual manner. From dry isopropanol, 75 grams of the sodium 3-isodecyloxy-2-hydroxy-1-propyl thiosulfate was crystallized in the form of white, waxy crystals. The yield was 85.5%. This thiosulfate compound had a soapy feel and good water solubility.

EXAMPLE 13

A 103.5 gram amount of polyoxyethylene ether of tridecyl alcohol containing on the average about 8.5 ethylene oxide residues for each tridecyloxy group and having a pH of about 6.8 in concentrated aqueous solution (Sterox AJ 100), 0.20 mole, was mixed with 21.9 grams (0.22 mole) epichlorohydrin, and 1 ml. of BF₃-etherate catalyst was added. The mixture was heated at about 100° C. for 15 minutes, and unreacted epichlorohydrin was then removed by heating to 100° C. under vacuum. The mixture was then cooled and run into 22 grams (0.22 mole) 40% aqueous alkali. The resulting mixture was heated with stirring and kept at 90° C. for 16 hours. The mixture formed two layers upon cooling. The reaction mixture was filtered to remove salt, and the lower, aqueous layer was separated and discarded. The upper layer was dried over sodium sulfate to give 96.3 grams of slight yellow, crude glycidyl ether of the polyoxyethylene tridecyl ether.

A 57.3 gram portion of the glycidyl ether was reacted with 24.8 grams sodium thiosulfate in a mixture of 50 ml. of water and 50 ml. of ethyl alcohol. The reaction mixture was kept acid to phenolphthalein by addition of hydrochloric acid as usual. The amount of hydrochloric acid required was 0.053 mole. The hot mixture separated into layers; the lower layer (aqueous salt layer) contained some surfactant, presumably Sterox AJ. The ethanol layer was dried as usual with addition of isopropyl alcohol and filtered. Distillation under vacuum to a 66° C. pot temperature left a rather viscous slightly yellow residue, 61.9 gram, as the crude sodium salt of 2-hydroxy-3-(tridecoxypolyethyleneoxy)-1-propyl thiosulfate,

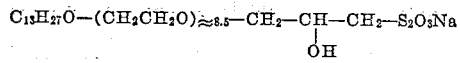

the thiosulfate salt was completely water soluble and had excellent detergent and lathering properties. The number of ethyleneoxy groups in surfactants of this alkoxy-polyethyleneoxy-vic-hydroxy-alkyl thiosulfate type can be varied considerably, e.g., from 1 to 20 or 25, so long as the total number of carbon atoms is suitable for the particular surfactant use.

EXAMPLE 14

A 40.5 gram (0.2 mole) amount of t-dodecyl mercaptan was added with stirring to a cooled (below 10° C.) solution of butadiene dioxide in 200 ml. ether containing 0.5 gram 40% aqueous sodium hydroxide. The addition was completed in 5 minutes. The temperature slowly rose to 34° C. and the reaction mixture became turbid; after the reaction mixture was stirred for 1½ hours without heating, the temperature was 28° C. The reaction mixture was then heated to reflux for one-half hour. The ether was removed by aspiration to a pot temperature of 50° C. The residual oil was then mixed with 100 ml. of ethanol and 100 ml. of a solution containing 0.2 mole of sodium thiosulfate. The temperature was gradually raised to 80° C., with addition of hydrochloric acid as required to maintain acidity to phenolphthalein. The product was worked up as in previous examples, with hexane extraction to remove insolubles. A gum, 10.2 gram, was obtained, which was soluble in both water and isopropanol. Redrying at 56° under vacuum gave the 2,3-dihydroxy-4-(t-dodecylthio)-1-butyl thiosulfate salt.

*Analysis.*—Calc'd. for

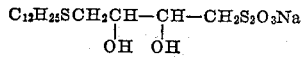

S, 22.6. Found: S, 22.72.

EXAMPLE 15

A mixture of normal alcohols (Adol 65), 258 gram (approximately 1 mole), and 95 gram (1 mole) of epichlorohydrin were melted together and treated with 1 ml. of boron trifluoride-etherate complex. The mixture was heated gently until exothermic reaction was evident, and the temperature was then kept at about 100° C. by water bath cooling for 1 hour. The reaction mixture was treated with activated alumina at a temperature above 40° C. to reduce acidity and filtered, the alumina solids being rinsed with hexane. The hexane was distilled off, and the bulk of the 219.3 grams of 3-n-alkoxy-1,2-propylene chlorohydrins distilled at 173–192° C./0.4–0.6 mm., and solidified to an essentially white solid of melting point, 30–35° C. The yield was 62.5% of theory. A 202 gram amount of the chlorohydrin compound was treated with 80 grams of 40% aqueous NaOH, with stirring and heating at 95–100° C. after addition of 100 ml. dioxane. The heating and stirring were continued for eighteen hours. The reaction mixture was cooled and filtered, and the aqueous layer which separated was discarded. From the dioxane layer, the n-alkyl glycidyl ether was isolated, being distilled at 156 to 179°/0.2–0.3 mm. in an amount of 138.8 grams.

The Adol 65 mixture of straight chain alcohols used in the above procedure contains the following percentages of different molecular weight straight chain alcohols:

| Alcohol: | Percent |
|---|---|
| $C_{14}$ | 5.3 |
| $C_{16}$ | 52.5 |
| $C_{18}$ | 39.8 |
| $C_{20}$ | 2.4 | and the percentage of unsaturation is about 5.3%.

A 62.8 gram quantity of the n-alkyl glycidyl ether in 100 ml. ethanol was treated with 73 ml. (0.22 mole) of sodium thiosulfate solution, with dropwise addition of hydrochloric acid. After a 1½ hour reaction period, the solution was almost clear. Ethyl alcohol and water were removed by distillation and gradual replacement with isopropanol. The hot, dry isopropanol solution (≈500 ml.) was allowed to cool causing the 3-n-alkoxy-2-hydroxy-1-propyl thiosulfate sodium salt to crystallize as fine white plates. The 73.5 grams of product represented a yield of 81.7% of theory. This thiosulfate salt has valuable lathering, detersive and other surfactant properties. While this thiosulfate is substituted on the 3-propyl carbon primarily by n-alkoxyl groups of 14 to 20 carbon atoms, it will be noted that the starting alcohols also contained unsaturated alkanols. The use of mixed straight-chain aliphatic groups is advantageous not only because of the good surfactant properties of the products, but also because of the availability of the starting alcohol mixtures.

EXAMPLE 16

In a procedure similar to that of Example 15, a mixture of straight chain alcohols (Lorol #5) was used which had approximately the following composition:

| Alcohol: | Percent |
|---|---|
| $C_6$ | 2 |
| $C_8$ | 9 |
| $C_{10}$ | 10 |
| $C_{12}$ | 45 |
| $C_{14}$ | 20 |
| $C_{16}$ | 7 |
| $C_{18}$ | 5 |

The alcohol mixture was converted to the propylene chlorohydrin derivative which was then treated with sodium hydroxide to form the glycidyl ether, as a crude faintly yellow, mobil oil, in 99% yield. A 100 gram portion of the crude glycidyl ether was treated with 167 ml. of sodium thiosulfate solution (0.5 mole), with continuous neutralization. The reaction was complete after about 2 hours. The reaction mixture was dried by distillation with addition of isopropyl alcohol, and the resulting isopropyl alcohol solution was filtered while hot, using a hot funnel. The filtrate was permitted to cool, and the sodium 3-n-alkoxy-2-hydroxy-1-propyl thiosulfates crystallized; the crystalline product became gummy upon standing in vacuo. The overall yield of the thiosulfate, based on the starting alcohol mixture, was 74%. The 3-n-alkoxy-2-hydroxy-1-propyl thiosulfates have valuable surfactant properties.

EXAMPLE 17

Tridecoxypropylene chlorohydrin was prepared by reacting tridecanol and epichlorohydrin in the presence of acid catalyst according to the procedure of Example 11, and was then separated from the reaction mixture by distillation; the yield based on tridecanol was 93%, and the yield based on epichlorohydrin was 83%. A portion of the chlorohydrin distilling at 199 to 230° C. at 0.4 mm. was then reacted with sodium thiosulfate under mildly alkaline conditions; 29.3 grams of the chlorohydrin and 50 ml. (0.15 mole) of aqueous sodium thiosulfate solution were mixed with 50 ml. ethyl alcohol. Thymolphthalein blue indicator was added to serve as a pH indicator, and 3 to 4 drops of 40% NaOH solution were added to bring pH just above the end-point (about pH 9); as the solution was warmed, the blue color disappeared, and additional NaOH was added (2.5 ml. 40%) to bring the pH just above the end point and the temperature reached 82° C.; as the reaction was continued for several hours, the pH dropped below the Thymolphthalein blue end point, the actual p-Hydrion readings being 8.5 to 9 during most of the reaction; the pH then rose above the end-point (p-Hydrion-9.4) indicating that there was insufficient chlorohydrin compound to react with the alkali, and dilute hydrochloric acid was then added to maintain pH below 9 until a diluted sample of the reaction mixture in water gave a clear, high-foaming solution and there was no further development of alkalinity. The reaction mixture was dried with isopropyl alcohol as usual and filtered twice, and the sodium 2-hydroxy-3-tridecoxy-1-propyl thiosulfate was crystallized from the dry isopropanol solution in an amount of 32.9 grams, for a yield of 83.8%. In a substantial repetition of the above procedure, utilizing about 30% of the stoichiometric amount of alkali (which can all be added at the start of the reaction provided the pH does not rise above about 9), the yield was 95.7%. It can be seen that the procedure of this example requires fewer steps and avoids the continuous acid addition of Example 11, and it can also result in a remarkable improvement in yield. When an attempt was made to carry out the reaction without the addition of alkali, only an insignificant amount of the 2-hydroxy-3-tridecoxy-1-propyl thiosulfate was obtained.

EXAMPLE 18

Potassium coconate was reacted with epichlorohydrin to prepare glycidyl coconate:

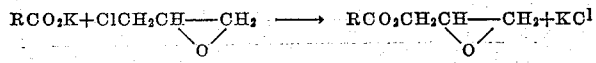

R representing the non-carboxylic portion of coconut acids. The glycidyl coconate was then reacted with sodium thiosulfate in a procedure similar to that of Example 1 to prepare the corresponding 2-hydroxy thiosulfate.

The unusual detergent properties of the long-chain vic-hydroxy aliphatic thiosulfates can be seen from the following table, in which sodium salts of the thiosulfates are compared to "Gardinol" as 100. In the tests, 0.20% aqueous solutions were used.

*Table I*

| vic-Hydroxy Thiosulfate | Relative Detergency (Percent) | |
|---|---|---|
| | Soft Water (50 p.p.m.) | Hard Water (300 p.p.m.) |
| 2-hydroxy-1-hexadecyl- and octadecyl thiosulfates [1] | 108 | 102 |
| 2-hydroxy-1-hexadecyl- and octadecyl thiosulfates [1] AWS | 122 | 127 |
| 2-hydroxy-1-hexadecyl- and octadecyl thiosulfate [2] | 108 | 106 |
| 2-hydroxy-1-hexadecyl- and octadecyl thiosulfate [2] AWS | 122 | 124 |
| 2-hydroxy-1-dodecyl thiosulfate | 63 | 61 |
| 2-hydroxy-1-dodecyl thiosulfate AWS | 104 | 77 |
| 3-n-dodecylthio-2-hydroxy-1-propyl thiosulfate | 40 | 114 |
| 2-(dodecylthio-hydroxycyclohexyl)-2-hydroxyethyl thiosulfate | 61 | 67 |
| 2-(dodecylthio-hydroxycyclohexyl)-2-hydroxyethyl thiosulfate AWS | 99 | 100 |
| 2-hydroxy-3-nonylphenoxy-1-propyl thiosulfate | 57 | 97 |
| 2-hydroxy-3-nonylphenoxy-1-propyl thiosulfate AWS | 81 | 95 |
| 3-dodecylphenoxy-2-hydroxy-1-propyl thiosulfate | 94 | 111 |
| 3-dodecylphenoxy-2-hydroxy-1-propyl thiosulfate AWS | 100 | 108 |
| 2-hydroxy-3-tridecoxy-1-propyl thiosulfate | 82 | 87 |
| 2-hydroxy-3-tridecoxy-1-propyl thiosulfate AWS | 99 | 108 |
| 2-hydroxy-3-(tridecoxypolyethyleneoxy)-1-propyl thiosulfate | 90 | 110 |
| 2-hydroxy-3-(tridecoxypolyethyleneoxy)-1-propyl thiosulfate AWS | 120 | 135 |

[1] This sample was the pure product from Example 1.
[2] This sample was the rather impure material from Example 2.
AWS in the above table indicates a built detergent containing water solubles, chiefly inorganic silicates, phosphates and sulfates along with about 15% of the named thiosulfate compounds.

"Gardinol" is a name which is applied to a mixture of sodium salts of sulfated alcohols having from approximately 10 to 16 carbon atoms.

It is clear from Table I that the long-chain vic-hydroxy aliphatic thiosulfates, particularly those in the $C_{16}$ to $C_{18}$ range, have remarkable detersive powers, either alone, or built with common detergent builders. The detersive properties of the tridecycloxyethyleneoxy thiosulfate compound were also particularly good.

The novel vic-hydroxy aliphatic thiosulfates containing 8 to 20 or more carbon atoms are also excellent foaming agents, producing high and remarkably stable foams in both hard and soft water as shown by Table II, wherein lather heights as measured by the Ross-Miles test are reported.

*Table II*

| vic-Hydroxy Thiosulfate | Centimeters of Lather | | | |
|---|---|---|---|---|
| | Soft Water (50 p.p.m.) | | Hard Water (300 p.p.m.) | |
| | At Once | After 5 Min. | At Once | After 5 Min. |
| 2-hydroxy-1-hexadecyl- and octadecyl thiosulfate [1] | 20.1 | 19.8 | 20.0 | 19.6 |
| 2-hydroxy-1-hexadecyl- and octadecyl thiosulfate [2] | 20.7 | 20.4 | 19.0 | 18.7 |
| 2-hydroxy-1-dodecyl thiosulfate | 11.2 | 6 | 16.6 | 15.0 |
| 2-(dodecylthiohydroxycyclohexyl)-2-hydroxyethyl thiosulfate | 7.5 | 7.5 | 6.4 | 6.0 |
| 2-hydroxy-3-nonylphenoxy-1-propyl thiosulfate | 14.1 | 10.4 | 21.2 | 21.1 |
| 3-dodecylphenoxy-2-hydroxy-1-propyl thiosulfate | 19.3 | 18.2 | 18.6 | 18.4 |
| 2-hydroxy-3-tridecoxy-1-propyl thiosulfate | 9.2 | 4 | 16.0 | 13.6 |
| 2-hydroxy-3-tridecoxy-1-propyl thiosulfate (purified) | 17.6 | 17.2 | 22.4 | 22.4 |
| 2-hydroxy-3-tridecoxypolyethyleneoxy-1-propyl thiosulfate | 17.2 | 15.3 | 19.2 | 15.6 |

[1] This sample was the pure product from Example 1.
[2] This sample was the rather impure product from Example 2.

In particular, the vic-hydroxy aliphatic thiosulfates in the range of 15 to 20 or so carbon atoms produce a high foam, and the foam is remarkably stable in both hard and soft waters. Consequently, the compounds will be useful in various applications as foaming agents and foam stabilizers, e.g., in aerosol shaving creams or food products, hand dishwashing detergents, and in various resin and rubber foaming procedures.

The long chain vic-hydroxy aliphatic thiosulfates are also good wetting agents, as shown by Table III in which the wetting times for some of the compounds in the foam of their sodium salts are recorded at various concentrations.

*Table III*

| vic-Hydroxy Thiosulfate | Wetting Time in Seconds | | | |
|---|---|---|---|---|
| | 0.5% | 0.25% | 0.125% | 0.0625% |
| 2-hydroxy-1-hexadecyl- and octadecyl thiosulfate | 42.7 | 60.7 | 111 | |
| 2-hydroxy-1-dodecyl thiosulfate | 5.4 | 7.4 | 47 | |
| 2-(dodecylthiohydroxycyclohexyl)-2-hydroxyethyl thiosulfate | 162 | 180+ | | |
| 2-hydroxy-3-nonylphenoxy-1-propyl thiosulfate | 3 | 4.5 | 8.7 | 38.8 |
| 3-dodecylphenoxy-2-hydroxy-1-propyl thiosulfate | 8.3 | 11.5 | 20.4 | 61.3 |
| 2-hydroxy-3-tridecoxy-1-propyl thiosulfate | 2.3 | 3.6 | 6.7 | 15.5 |
| 2-hydroxy-3-isodecoxy-1-propyl thiosulfate | 3.9 | 16.7 | 83.4 | |
| 2-hydroxy-3-(tridecoxypolyethyleneoxy)-1-propyl thiosulfate | 3.7 | 6.4 | 11.9 | 28.4 |
| 3-hexadecoxy-2-hydroxy-1-propyl thiosulfate | 5.3 | 6.0 | 7.3 | 13.4 |

The values recorded are the times necessary for a 1.5 gram weight to cause a 5 gram skein of cotton yarn to sink in the stated concentrations (percent by grams per milliliter of solution) of the compounds in aqueous solution (Draves-Clarkson Test, Amer. Dyestuff Reporter, 28, 420–428, Aug. 7, 1939).

The above data indicates that the number of carbon atoms in the best long-chain β-hydroxy aliphatic thiosulfate wetting agents will be somewhat lower than the preferred ranges of carbon atoms for detergents and foaming agents.

While a valuable and efficient method of producing my long-chain vic-hydroxy aliphatic thiosulfates is described herein, it will be realized that my novel compounds will have valuable surfactant and other properties when they are successfully produced by any other method.

In addition to the surfactant applications described in detail above, it will be appreciated that many other surfactant applications of the long-chain vic-hydroxy aliphatic thiosulfates will be possible, e.g., as emulsifiers, dispersants, sequestrants, water softeners, surface tension reducing agents, etc.

Long-chain vic-hydroxy aliphatic thiosulfate surfactants have been described. A method of preparing long-chain vic-hydroxy aliphatic thiosulfates by reacting long-chain aliphatic epoxides with inorganic thiosulfate salts while adding hydrochloric acid to neutralize alkalinity has been described. In addition, there is described a general method of solubilizing hydrophobic materials by converting them to epoxy derivatives and thence to vic-hydroxy thiosulfate derivatives. Methods of converting polyethers, active-hydrogen-containing compounds, etc., to vic-hydroxy thiosulfates have been described. A method of converting organic chlorohydrins to vic-hydroxy organic thiosulfates through reaction with thiosulfate salts under mildly alkaline conditions has been described. The solubilizing of hydrophobic materials by converting them to chlorohydrin derivatives and then to vic-hydroxy thiosulfate derivatives has been described.

I claim:
1. As new compounds, vic-hydroxy higher fatty thiosulfates containing at least 8 and not more than 20 carbon atoms and in which the higher fatty group is selected from the group consisting of hydrocarbon, oxahydrocarbon, and thiahydrocarbon groups.

2. As new compounds, 2-hydroxyalkyl thiosulfate salts in which the alkyl group contains from 8 to 20 carbon atoms.

3. As new surfactant compounds, the alkali metal 2-hydroxyalkyl thiosulfate salts, in which the alkyl group contains 12 to 20 carbon atoms.

4. The compounds of claim 3 in which the alkyl group is a straight-chain alkyl group.

5. The compounds of claim 3 in which the alkyl group is a branched-chain alkyl group.

6. As new surfactant compounds, 2-hydroxy-1-alkyl thiosulfates in which the alkyl group contains 15 to 20 atoms.

7. As new compounds, vic-hydroxy alkyl thioether thiosulfate anions in which the alkyl group contains at least 8 but not more than 20 carbon atoms.

8. As new compounds 2-hydroxy-4-oxa alkyl thiosulfate anions in which the alkyl group contains at least 8 but not more than 20 carbon atoms.

9. As new compounds, 2-hydroxy-4-thia-alkyl thiosulfates in which the alkyl group contains at least 8 but not more than 20 carbon atoms.

10. As a new compound, 2-hydroxy-3-tridecoxy-1-propyl thiosulfate, in which the tridecoxy group has a branched chain.

11. As a new compound, 2-hydroxy-3-isodecoxy-1-propyl thiosulfate.

12. As a novel composition, the mixture of compounds represented by the formula

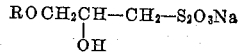

in which R represents a mixture of higher fatty hydrocarbon groups of 14, 16, 18 and 20 carbon atoms, principally 16 and 18 carbon atoms.

13. A mixture of 3-n-alkoxy-2-hydroxy-1-propyl thiosulfates in which the alkoxy groups have even numbers of carbon atoms from 6 to 18, principally 12 and 14 carbon atoms.

14. As new compounds, vic-hydroxy polyalkylene ether thiosulfates.

15. As a new compound, the compound represented by

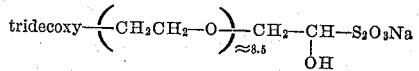

in which 8.5 is the approximate average number of ethylene oxide residues in the compound.

16. As new compounds, 3-acyloxy-2-hydroxy-1-propyl thiosulfates containing at least 8 but not more than 20 carbon atoms, and in which the acyloxy group is higher fatty acid acyloxy group.

17. As a composition, a mixture of sodium 2-hydroxy-1-hexadecyl- and octadecyl thiosulfates.

18. As a new compound, sodium 2-hydroxy-1-dodecyl thiosulfate.

19. As new compounds, phenoxy-vic-hydroxyalkyl thiosulfates.

20. A method of preparing long-chain β-hydroxy aliphatic thiosulfates which comprises reacting an α,β-epoxy alkane containing at least 8 but not more than 20 carbon atoms with an alkaline thiosulfate with the addition of sufficient hydrochloric acid to neutralize alkalinity as formed during the reaction, to form the corresponding β-hydroxy aliphatic thiosulfate.

21. A method of preparing long-chain 2-hydroxyalkyl thiosulfates which comprises heating at 50 to 100° C. an alkyl 1,2-epoxide containing at least 8 but not more than 20 carbon atoms with a stoichiometric excess of sodium thiosulfate in aqueous alcohol solution with the addition of sufficient hydrochloric acid during the reaction to maintain the reaction mixture slightly acid to phenolphthalein, separating the resulting sodium chloride salt-containing aqueous layer from the resulting organic product layer, and isolating the sodium 2-hydroxyalkyl thiosulfate.

22. A method of water-solubilizing a higher fatty acid which comprises heating a fatty acid containing from 12 to 20 carbon atoms with epichlorohydrin and a base to produce the corresponding glycidyl compound, and reacting said glycidyl compound with an alkaline thiosulfate to produce the corresponding β-hydroxy thiosulfate.

23. A method of water-solubilizing a higher fatty alcohol which comprises heating a fatty alcohol containing 12 to 20 carbon atoms with epichlorohydrin and a base to produce the corresponding glycidyl compound, and reacting said glycidyl compound with an alkaline thiosulfate to produce the corresponding β-hydroxy thiosulfate.

24. A method of preparing 2-hydroxy thiosulfates which comprises reacting a 1,2-chlorohydrin with an alkali metal thiosulfate salt under mildly alkaline conditions.

25. A method of preparing 2-hydroxy thiosulfates which comprises reacting a propylene chlorohydrin containing no more than 20 carbon atoms of the formula:

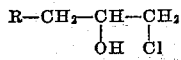

in which R is selected from the group consisting of alkyl, alkoxy, and alkthio groups, with alkali thiosulfate in aqueous medium in the presence of a small amount of alkali, substantially all of the reaction occurring at a pH no greater than 10, and neutralizing the reaction mixture by addition of acid.

26. A method of preparing 2-hydroxy thiosulfates which comprises reacting a propylene chlorohydrin containing no more than 20 carbon atoms of the formula:

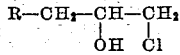

in which R represents monocyclic aryloxy, with alkali thiosulfate in aqueous medium in the presence of a small amount of alkali, substantially all of the reaction occurring at a pH no greater than 10, and neutralizing the reaction mixture by addition of acid.

References Cited in the file of this patent

UNITED STATES PATENTS

| | | |
|---|---|---|
| 1,969,612 | Kaiser et al. | Aug. 7, 1934 |
| 2,012,073 | Schirm et al. | Aug. 20, 1935 |
| 2,218,660 | Schowalter et al. | Oct. 22, 1940 |
| 2,622,090 | Sundien | Dec. 16, 1952 |

FOREIGN PATENTS

| | | |
|---|---|---|
| 364,107 | Great Britain | Dec. 28, 1931 |